United States Patent [19]

Shillam

[11] 4,313,346
[45] Feb. 2, 1982

[54] ACCELEROMETERS

[75] Inventor: Norman F. Shillam, Farnborough, England

[73] Assignee: The Secretary of State for Defence in Her Britannic Majesty's Government of the United Kingdom of Great Britain and Northern Ireland, London, England

[21] Appl. No.: 126,255

[22] Filed: Mar. 3, 1980

[30] Foreign Application Priority Data

Mar. 1, 1979 [GB] United Kingdom ............... 07291/79

[51] Int. Cl.³ ............................................. G01P 15/08
[52] U.S. Cl. .................................. 73/517 R; 310/306
[58] Field of Search ................... 73/516 R, 517 R, 12; 310/306, 300; 322/2 R; 136/205

[56] References Cited

U.S. PATENT DOCUMENTS

| 3,036,458 | 5/1962 | Vali | 73/141 A X |
| 3,269,174 | 8/1966 | Linville | 73/141 A |
| 3,501,653 | 3/1970 | Bailey | 310/300 |

Primary Examiner—James J. Gill
Attorney, Agent, or Firm—Pollock, Vande Sande & Priddy

[57] ABSTRACT

An accelerometer includes a thermocouple circuit which comprises a movable member and a second member which abuts the movable member, wherein the abutting parts of the members include a cutting portion and wherein said parts are composed of dissimilar metals, for example steel and tungsten carbide, and recording means connected to the members for recording a thermoelectric signal generated when the cutting portion cuts the abutting part of the other member during acceleration.

5 Claims, 3 Drawing Figures

U.S. Patent    Feb. 2, 1982    4,313,346
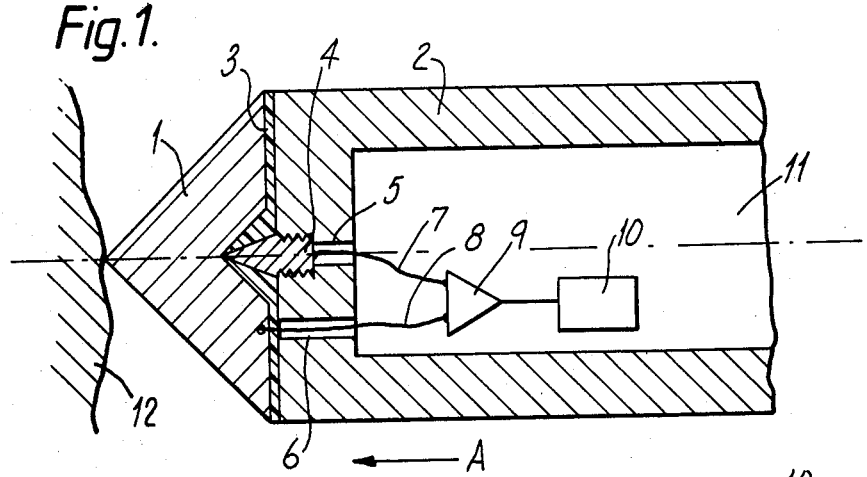
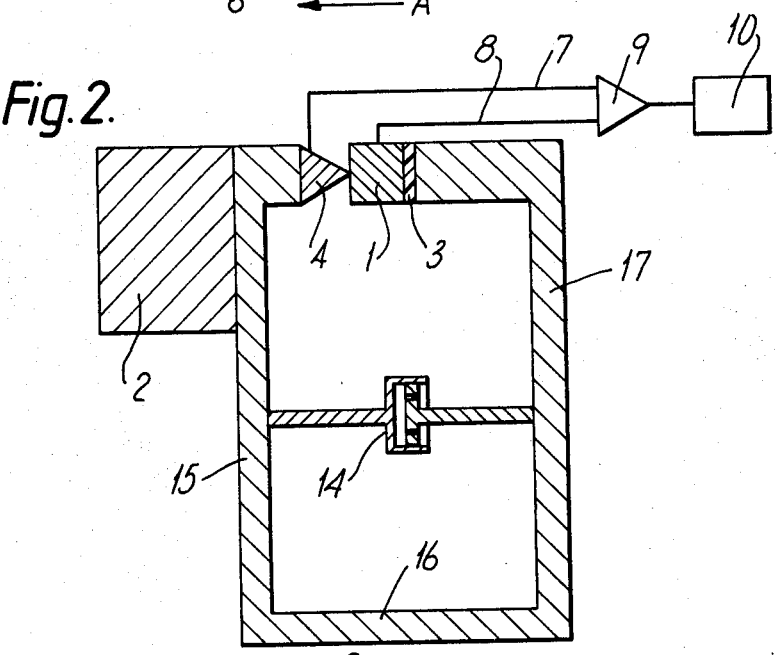
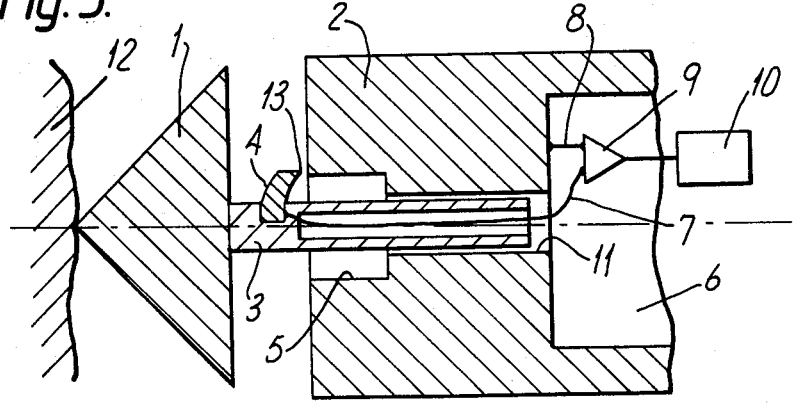

ACCELEROMETERS

This invention relates to accelerometers and particularly, though not exclusively, to accelerometers capable of recording impact shock signatures.

Known forms of accelerometer include the spring-mass accelerometer and the piezoelectric, piezoresistive, variable capacitance and strain gauge accelerometers. Of these, the piezoelectric and piezoresistive accelerometers are particularly suitable for recording impact shock signatures involving high rates of change of 'g'.

The invention provides an alternative form of accelerometer of simple, rugged construction which is capable of impact shock recording.

According to the present invention an accelerometer comprises:

a thermocouple circuit which includes a moveable member and a second member, part of which abuts the moveable member, wherein the abutting parts include a cutting edge and wherein the edge and the part which abuts the edge are of dissimilar metals, and means connected to the members for recording a thermoelectric signal generated when the cutting edge cuts the edge abutting part during acceleration.

The moveable member may constitute the seismic mass of the accelerometer.

Embodiments of the invention will now be described, by way of example only, with reference to the drawings which are schematic and of which FIGS. 1, 2 and 3 show sectional side elevations of first, second and third embodiments respectively, of the invention.

FIG. 1 shows an accelerometer which forms part of an acceleration recording system for a shell, and which includes a hollow, cylindrical body 2 of steel which carries a conical headed member 4 of tungsten carbide mounted on one end of the body by means of screw threaded portions on the body 2 and the member 4. A conical nose 1 of steel is mounted on a compressible spacer 3 of insulative plastics material which extends around the head of member 4 and over the end of the body 2. The apex of the conical headed member 4 extends through a small hole in the spacer 3 into a conical depression in the nose 1 making contact therewith. An insulated wire 7 extends through a bore 5 in the end of the body 2 and connects the member 4 with an input of a dual input operational amplifier 9. A second input of the amplifier 9 is connected by an insulated wire 8 which passes through a bore 6 in the end of the body 2 and through the spacer 3, to the conical nose 1. The wire 8, the steel nose 1, the tungsten carbide member 4 and the wire 7 form part of a thermocouple circuit, the amplifier 9 being arranged to amplify a thermoelectric voltage produced in the circuit. The amplifier 9 has its output connected to a recorder 10. The amplifier 9 and the recorder 10 are housed in a cavity 11 of the body 2.

In operation, when the nose 1 of the shell travelling in the direction of the arrow A shown in FIG. 1 strikes a target 12, the nose undergoes rapid deceleration and the body 2 acts as the seismic mass of the accelerometer and urges the conical headed member 4 into the conical depression in the nose 1, the member 4 cutting the nose 1 and thereby producing a thermoelectric voltage in the thermocouple circuit which is amplified by the amplifier 9.

The amplified voltage is recorded over the duration of the impact by the recorder 10. The value of a thermoelectric voltage V produced in the circuit is given by $$V = k(\dot{\theta}_2 - \dot{\theta}_1)$$

where k=constant, and $\dot{\theta}_2 - \dot{\theta}_1$ is the difference in speed, due to impact, between member 4 and the nose 1. The temperature at the points where the wires 7 and 8 join the member 4 and the nose 1, respectively, will be substantially the same during the very short period of impact.

FIG. 2 illustrates a second embodiment of the invention in which a seismic mass of lead 2 is carried on one side of an arm 15 of a U-shaped spring 16.

A conical headed member 4 of tungsten is carried on the other side of the arm 15. A second arm 17 of the spring 16 is fixed and carries a cube 1 of steel mounted on an insulative plastics pad 3 on the arm 17. The head of the cone 4 abuts part of a face of the cube 1. A pneumatic damper 14 is connected to the arms 17 and 15 to damp movement of arm 15. An insulated wire 7 connects the member 4 to an input of a dual input operational amplifier 9 and a second insulated wire 8 connects the steel cube 1 to the other input of the amplifier 9. The amplifier 9 has its output connected to a recorder 10. The wires 7 and 8, the cube 1 and the cone 4 form part of a thermocouple circuit.

In operation, when the accelerometer is accelerated such that the lead mass 2 which constitutes the seismic mass of the accelerometer is urged in the direction of the arrow B in FIG. 2 towards the steel cube 1, the head of the cone 4 will cut into the cube 1 and produce a thermoelectric voltage which is amplified by the amplifier 9 and the amplified voltage recorded in the recorder 10.

FIG. 3 illustrates a third embodiment of the invention which forms part of an acceleration recording system for a shell that includes a conical headed member 1 of steel which is carried on a closed end of a steel tube 3. The tube 3 is slidable along its axis in a coaxial bore 11 in a steel body 2 which forms part of a casing of the shell. The bore 11 terminates at one end in a larger diameter coaxial bore 5 and at the other end which is remote from the member 1 in a chamber 6. A tungsten blade 4 of arcuate configuration is rigidly fixed in a slot in the tube 3 and in the position shown in FIG. 3 a tip 13 of the blade is closely spaced from the mouth of the bore 5 and is at a slightly greater distance from the axis of the tube than the radius of the bore 5. An insulated wire 7 extends through the tube 3 into the chamber 6 and connects the blade 4 with one input of a dual input amplifier 9. A second input of the amplifier 9 is connected by an insulated wire 8 to the body 2 at a region which forms part of a wall of the chamber 6. As in the previous embodiments the amplifier 9 has its output connected to a recorder 10, and the wires 7 and 8, the steel body 2 and the tungsten blade 4 form part of a thermocouple circuit.

In operation, when the conical headed member 1 strikes a hard target 12 the tube 3 is urged along the bore 11 towards the chamber 6. The tungsten blade 4 cuts the body 2 in a region which forms a cylindrical wall of the bore 5 and a thermoelectric voltage is generated amplified and recorded as in the previous embodiments.

I claim:

1. An accelerometer including a thermocouple circuit which comprises a movable member and a second member, part of said second member abutting a part of said movable member, wherein abutting parts of said members include a cutting portion and wherein said parts are composed of dissimilar metals, and recording means connected to the members for recording a thermoelectric signal generated when said cutting portion cuts the abutting part of said other member during acceleration.

2. An accelerometer as in claim 1 wherein said movable member constitutes accelerometer seismic mass.

3. An accelerometer as in claim 1 wherein said cutting portion comprises a solid cone composed of tungsten carbide and the abutting part of the other member is composed of steel and abuts said cone apex.

4. An accelerometer as in claim 1 wherein said cutter portion comprises a sharp edged element composed of tungsten carbide and the abutting part of the other member is composed of steel and abuts said sharp edged element.

5. An accelerometer as in claim 1 further including damping means connected to said movable member and arranged to damp the movement thereof.

* * * * *